May 31, 1927.
C. D. TUSKA
VARIOMETER
Original Filed June 17, 1922
1,630,873
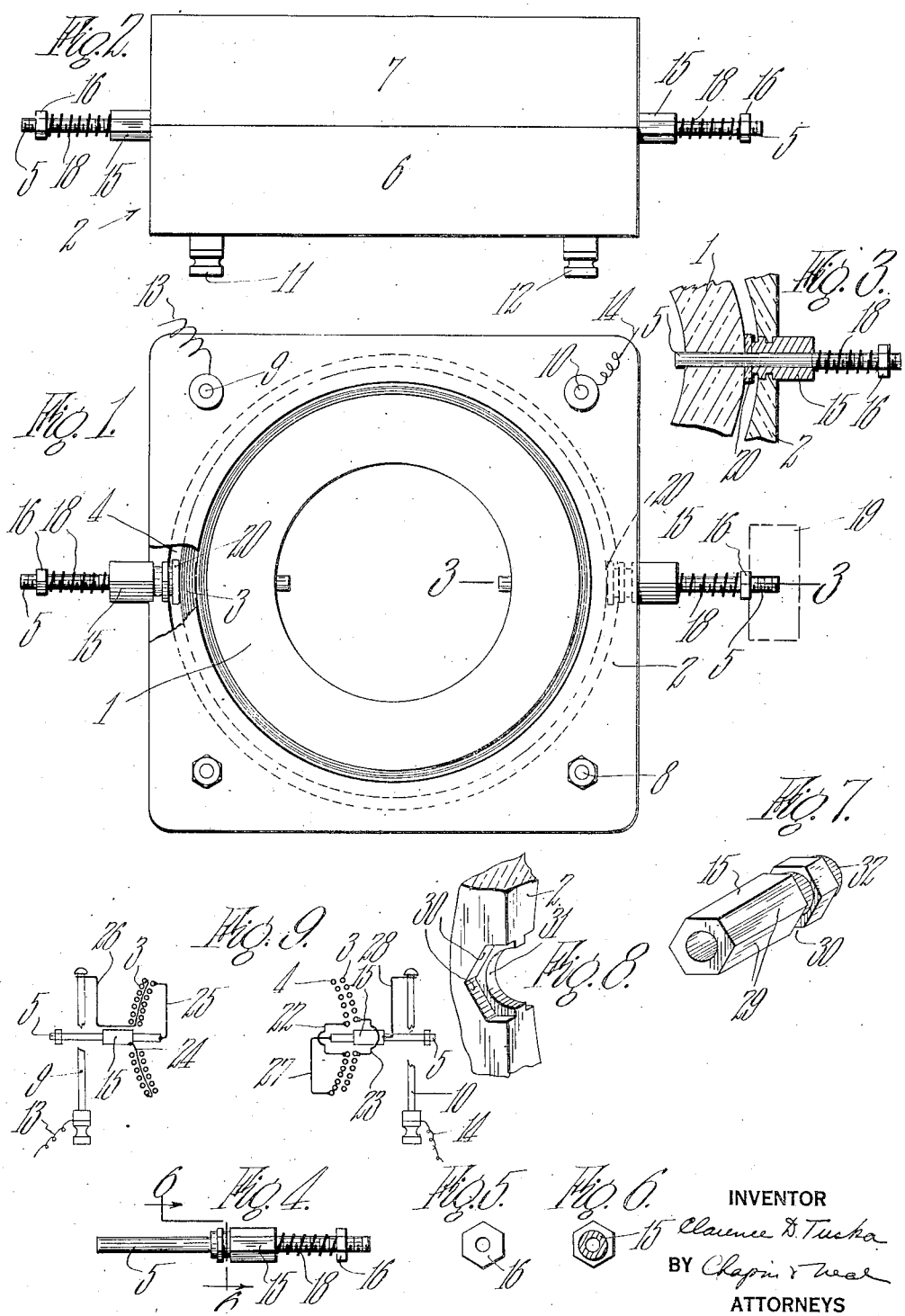
INVENTOR
Clarence D. Tuska
BY Chapin & Neal
ATTORNEYS Patented May 31, 1927.

1,630,873

UNITED STATES PATENT OFFICE.

CLARENCE D. TUSKA, OF HARTFORD, CONNECTICUT, ASSIGNOR TO THE C. D. TUSKA COMPANY, OF HARTFORD, CONNECTICUT, A CORPORATION OF CONNECTICUT.

VARIOMETER.

Application filed June 17, 1922, Serial No. 569,082. Renewed February 11, 1927.

The present invention relates to an improved construction for variometers, variocouplers and the like such as are commonly employed in radio circuits.

An object of the invention is to provide an improved construction for variometers of the type wherein the circuit connections with the movable winding are made by contact between the rotor shaft or trunnions and the bearings therefor.

A further object of the invention is to improve the bearings for the shaft or trunnions of the rotor tending to insure more reliable circuit connections with the movable winding and positively preventing axial displacement of the rotor in the case of a variometer.

A still further object is to improve the general construction of such devices as employ a stator with a relatively movable rotor and is applicable to either a variometer or vario-coupler.

The features of the invention will be readily understood from an inspection of the accompanying drawings, in which,—

Fig. 1 is a view, in front elevation, of a variometer embodying the present invention in its preferred form, a portion of the stator being broken away to more completely disclose the bearing for one of the rotor trunnions;

Fig. 2 is a plan view of the variometer;

Fig. 3 is a sectional view taken along the line 3—3 of Fig. 1;

Fig. 4 is a side elevational view of one of the rotor trunnions together with its bearing;

Fig. 5 is a view, in end elevation, of the bearing shown in Fig. 4;

Fig. 6 is a section on the line 6—6 of Fig. 4;

Fig. 7 is a perspective view of one of the bearing sleeves for the rotor trunnions;

Fig. 8 is a perspective view of a portion of the stator frame showing the recess into which the bearing sleeve is fitted; and Fig. 9 is a diagrammatic view of the windings and electrical connections of the variometer shown in Fig. 1.

The variometer illustrated in Figs. 1 and 2 is, in general, similar to that disclosed in a copending application, Serial No. 458,011, filed April 2, 1921, by the present inventor. The construction and arrangement of the parts of the present variometer will however be more or less briefly described herein in order that the advantages of the present invention may be more clearly understood and appreciated.

Referring to the drawings, the rotor of the illustrated variometer is indicated at 1 and the stator at 2. The rotor 1 comprises an annular frame having a spherical exterior surface upon which is wound the movable or inner winding 3. The stator 2 comprises a frame having a rectangular exterior and an internal spherical surface which closely surrounds the spherical exterior of the rotor and upon which is laid the turns of the outer or stationary winding 4. The annular rotor frame is composed of molded dielectric material and is provided with diametrically disposed trunnions 5 which extend outwardly through opposite sides of the stator. The trunnions 5 are securely anchored in the rotor frame and their inner extremities project beyond the inner periphery of said frame to facilitate the attachment thereto of leads from the inner winding as will be later described. The frame of the stator is also composed of molded dielectric material and is made in two parts 6 and 7 divided in the common vertical axial plane of the rotor trunnions and secured together in face-to-face abutting relation by means of four tie-bolts which extend transversely through both frame parts adjacent the four corners thereof. The two lowermost tie-bolts are indicated at 8 in Fig. 1 and the two uppermost tie-bolts are indicated at 9 and 10 and the latter constitute binding posts to which are secured the terminals of the stationary and movable windings 3 and 4. The binding posts 9 and 10 are severally provided with suitable nuts 11 and 12 between which may be secured the circuit wires 13 and 14. The stator frame is provided with bearing sleeves 15 for the rotor trunnions, each sleeve fitting within a recess in said frame that is formed partially in the frame part 6 and partially in the frame part 7. The trunnions 5 project outwardly beyond the bearing sleeves 15 and are threaded to receive nuts 16. A helical spring 18 surrounds the outwardly projecting end of each trunnion, the spring bearing at one end against the nut 16 and at the opposite end against the bearing sleeve 15. A washer 20 is located upon each trunnion 5 between the rotor frame and the inner end of the bearing sleeve 15 for the purpose of locating the rotor centrally between the bearing sleeves. The springs 18 serve to yieldingly oppose the turning of the rotor sufficiently to frictionally maintain the latter in adjusted position. The springs 18 press against the adjacent ends of the bearing sleeves, insuring tension contact therewith at all times and thus affording absolutely reliable connections between the windings of the stator and rotor. The nuts 16 are capable of being turned to vary the compression of the springs 18. A knob may be fixed to one of the trunnions, as indicated at 19 in Fig. 1, to enable the rotor to be turned conveniently for the purpose of varying the inductance.

The windings and the electrical connections are diagrammatically illustrated in Fig. 9. As therein shown, inner and outer windings each comprise two coils which are located at opposite sides of the rotational axis of the rotor. The coils of the inner windings are connected by the lead 22, the coils of the outer windings are connected by the lead 23, and the inner and outer windings are connected in series through the trunnion and bearing sleeve shown at the left side of Fig. 9, a lead 24 connecting the outer winding directly with said sleeve while a lead 25 connects the inner winding directly with said trunnion. The outer winding is connected with the binding post 9 by means of a lead 26 while the inner winding is connected with the binding post 10 through the trunnion and bearing sleeve shown at the right of Fig. 9 connecting the inner winding directly with said trunnion while a lead 28 connects said sleeve directly with said binding post. In each instance these connections are made by solder joints between the leads referred to and the respective bearing sleeves and trunnions. As shown in Fig. 9, the current from the circuit wire 13 flows through the binding post 9 and the lead 26 to the outer winding 3. From the outer winding the current flows through the lead 24, the left hand bearing sleeve 15 and trunnion 5, and the lead 25 to the inner winding. From the inner winding the current flows through the lead 27, the right hand trunnion 5, and bearing sleeve 15, the lead 28 and the binding post 10, to the circuit wire 14.

It will be seen that all wires are connected to fixed parts, this construction permitting the use of solder joints between said wires and the parts to which they are connected. All points of contact between movable parts are made through the helical springs 18 which surround the trunnions 5 and insure continuous tension contact therewith.

With the exception of the bearing sleeves 15, the parts thus far specifically referred to are or may be constructed, arranged and electrically connected as set forth in the co-pending application herebefore mentioned. As shown in my prior application the rotor trunnions were journalled in bearing sleeves having the usual cylindrical outer faces, these sleeves being supported in cylindrical recesses in the stator frame one half of each of said recesses being formed in one of the frame parts while the other half of each of said recesses is formed in the other frame part. When the frame parts are assembled and secured together by tie-bolts more or less pressure is exerted against the opposite sides of the bearing sleeves by the corresponding recessed portions of the frame parts, and this somewhat unreliable clamping action is relied upon to hold the bearing sleeves in place.

In practice it has been found that bearing sleeves constructed and arranged as above described are liable to become axially displaced so as to interfere with their requisite concentric relation to the stator windings and thus to render unequal the distances between the inner and outer windings at opposite sides of the rotor. It has further been found that by reason of the uncertain clamping action of the two halves of the stator frame against the bearing sleeves, the latter have a tendency to turn relatively to the stator as the rotor is turned to vary the inductance of the circuit. If the bearing sleeves are permitted to turn more or less with the rotor trunnions it is obvious that after a time the solder joints between said sleeves and the leads connected thereto will become weakened or broken so that the circuit connections with the variometer are liable to be interrupted at any time.

For the purpose of insuring more reliable and effective circuit connections and to insure the maintenance of the inner winding in accurate concentric relation with the outer winding, the present invention is concerned with the provision of means to prevent both turning and axial displacement of the bearing sleeves. To this end, in accordance with the present invention, each bearing sleeve 15 is formed with a polysided or non-cylindrical outer peripheral surface and the recess in the stator frame wherein said bearing sleeve is received is shaped to fit closely the contour of said sleeve. Preferably, as shown, the exterior of the bearing sleeve is hexagonal in cross-sectional contour, said surface being provided with the angularly disposed faces, as indicated at 29 in Fig. 7, and the recessed portion of each half of the stator frame is formed with side walls shaped to conform exactly to the contour of one half of the outer peripheral surface of the bearing sleeve, these side walls of the stator having the angularly disposed faces indicated at 30 in Fig. 8. By constructing the bearing sleeves with polysided outer peripheral surfaces and by forming the recesses in which said sleeves are supported so that said recesses fit closely the exteriors of said sleeves, the latter are positively prevented from turning relatively to the stator. With this construction there is no danger that the soldered joints between the bearing sleeves and the lead wires will become weakened. Also a tension contact is positively insured between the rotor trunnions and the bearing sleeves and consequently a better and more reliable electrical contact is insured between the windings of the stator and rotor.

To insure the maintainance of the inner and outer windings of the variometer in accurate concentric relation, the present invention also contemplates the provision of interengaging locating means for preventing axial displacement of the bearing sleeves. To this end, each bearing sleeve 15 is formed with a transverse annular channel in its outer peripheral surface which is adapted to receive a two-part annular tongue or rib 31, one half of which is formed upon one of the stator frame parts while the other half of said rib is formed upon the other stator frame part. Obviously a transverse annular rib might be formed upon the bearing sleeve and a semi-annular channel might be formed in the recessed portion of each stator frame part to receive the rib of the sleeve. It has been found, however, that dielectric material, such as is ordinarily employed in variometer construction, is capable of being readily molded to provide a stator frame having a locating rib and a polysided recess such as shown in Fig. 8. It is, of course, a simple operation to form an annular channel in the exterior of the bearing sleeve. Accordingly, it is preferred to employ the relative arrangement of the interengaging rib and channel locating means as illustrated in the drawings. The inner ends of the bearing sleeves may be made with cylindrical outer peripheral surfaces, as shown at 32 in Fig. 7, to facilitate the looping of lead wires thereabout.

The invention having been described, that which is claimed and desired to be secured by Letters Patent is:—

1. In a device of the character described, the combination with the rotor and the rotor trunnions, of a bearing sleeve for one of said trunnions having a transverse annular channel in its exterior surface, a stator comprising a two-part frame for supporting the stationary winding, said frame being divided in a plane extending through the axes of said trunnions and the opposed faces of said frame parts having recesses for receiving the opposite sides of said bearing sleeve, semi-annular ribs on the walls of said recesses for engaging within said channels to prevent axial displacement of said sleeve, and means for securing together said frame parts.

2. In a device of the character described, the combination with the rotor, and the rotor trunnions, of bearing sleeves for said trunnions each sleeve being provided with a transverse groove in its exterior, a stator comprising a two-part frame for supporting the stationary winding, said frame being divided in a plane extending through the axes of said trunnions and the opposed faces of said frame parts having recesses for receiving opposite sides of said sleeves, projections integrally formed on said frame parts for engaging within said grooves to prevent axial displacement of said sleeves, and means for securing together said frame parts.

3. In a device of the character described, the combination with the rotor and the rotor trunnions, of a bearing sleeve for one of said trunnions having a non-cylindrical exterior surface and a transverse annular channel in said surface, a stator comprising a two-part frame for supporting the stationary winding, said frame being divided in a plane extending through the axes of said trunnions and the opposed faces of said frame parts having non-cylindrical recesses shaped to fit closely the exterior surfaces of said sleeve to prevent turning of the sleeve relatively to the stator, semiannular ribs upon the walls of said recesses for engaging within said channel to prevent axial displacement of said sleeve. and means for securing together said frame parts.

4. In a device of the character described, a rotor provided with trunnions, a stator, and a bushing providing a bearing for one of the rotor trunnions, said bushing being adapted to fit within a recess in the stator and having an annular channel in its exterior surface adapted to receive a corresponding rib on the wall surrounding said recess to prevent axial displacement of the bushing.

5. In a device of the character described, a rotor having trunnions, a stator, and a bushing providing a bearing for one of the rotor trunnions, said bushing having a polysided exterior surface adapted to fit closely within a correspondingly shaped recess in the stator to prevent turning of said bushing relatively to the stator, and a transverse annular groove in said surface adapted to receive an annular rib on said stator to prevent axial displacement of the bushing.

6. In a device of the character described, a rotor having oppositely disposed trunnions, a stator comprising two parts, journal bearing members to receive said trunnions and interposed between said stator parts and means for fastening said stator parts together in clamped relation upon said interposed bearing members.

7. In a device of the character described, a rotor having oppositely disposed trunnions, a stator comprising two parts, journal bearing members to receive said trunnions and having non-cylindrical outer surfaces fitted between said stator parts to prevent rotation of said bearing members, and means for fastening said stator parts together in clamped relation upon said interposed bearing members.

8. In a device of the character described, a rotor having oppositely disposed trunnions, a stator comprising two abutting parts having their abutting faces provided with registering notches, journal bearing members to receive said trunnions and fitting in said registering notches and means for fastening said stator parts together in clamped relation upon said interposed bearing members.

9. In a device of the character described, a rotor having oppositely disposed trunnions, a stator comprising two abutting parts having their abutting faces provided with non-circular registering notches, journal bearing members to receive said trunnions and having non-cylindrical outer surfaces fitting in said registering notches to prevent rotation of said bearing members and means for fastening said stator parts together in clamped relation upon said interposed bearing members.

10. In a device of the character described, a rotor formed with a spherical exterior surface for carrying the movable windings and having oppositely disposed trunnions, a stator comprising two parts each having a spherical internal surface for carrying the stationary windings spaced from said rotor windings, journal bearing members to receive said trunnions and interposed between said stator parts and means for fastening said stator parts together in clamped relation upon said interposed bearing members.

11. In a device of the character described, a stator including a pair of blocks of insulating material with a winding on their internal peripheries, binding posts extending through said blocks for holding them together, a rotor having a rotor winding and trunnions journalled in said blocks, the opposite ends of said rotor winding being connected to said trunnions, and connections leading from the binding posts to said windings.

12. In a device of the character described, a stator body including a pair of abutting blocks of insulating material with their abutting faces provided with registering notches, a stator winding on the internal periphery of said body, binding posts securing said blocks together, metallic sleeves in said notches, a rotor having a pair of trunnions journalled in said sleeves and a rotor winding the ends of which are connected to said trunnions, and a wire connecting one of said sleeves to one of said binding posts, one end of the stator winding being connected to the other of said sleeves and the other end of said stator winding being connected to another of said binding posts.

In testimony whereof I have affixed my signature.

CLARENCE D. TUSKA.